United States Patent
Devitt et al.

(10) Patent No.: US 10,323,687 B2
(45) Date of Patent: Jun. 18, 2019

(54) SNAP JOINT FOR EXTERNALLY PRESSURIZED GAS BEARINGS

(71) Applicant: New Way Machine Components, Inc., Aston, PA (US)

(72) Inventors: Andrew Devitt, Media, PA (US); James Allen, Springfield, PA (US)

(73) Assignee: NEW WAY MACHINE COMPONENTS, INC., Aston, OH (US)

( * ) Notice: Subject to any disclaimer, the term of this patent is extended or adjusted under 35 U.S.C. 154(b) by 0 days.

(21) Appl. No.: 15/698,053

(22) Filed: Sep. 7, 2017

(65) Prior Publication Data

US 2018/0066705 A1   Mar. 8, 2018

Related U.S. Application Data

(60) Provisional application No. 62/384,462, filed on Sep. 7, 2016.

(51) Int. Cl.

| F16C 32/06 | (2006.01) |
|---|---|
| F16C 35/063 | (2006.01) |
| F16C 35/067 | (2006.01) |
| F16C 39/04 | (2006.01) |
| F01D 25/16 | (2006.01) |

(Continued)

(52) U.S. Cl.
CPC ........ *F16C 32/0618* (2013.01); *F01D 25/166* (2013.01); *F01D 25/186* (2013.01); *F16C 32/0614* (2013.01); *F16C 33/664* (2013.01); *F16C 35/063* (2013.01); *F16C 35/067* (2013.01); *F16C 39/04* (2013.01); *F01D 25/22* (2013.01); *F16C 2226/74* (2013.01)

(58) Field of Classification Search
CPC .............. F16C 32/0614; F16C 32/0618; F16C 33/6659; F16C 33/6611; F16C 35/063; F16C 35/067; F16C 39/04; F16C 2226/74; F16C 33/664; F16F 15/0237; F01D 25/166; F01D 25/186; F01D 25/22
USPC ........... 384/99, 100, 107, 109, 119, 309–312
See application file for complete search history.

(56) References Cited

U.S. PATENT DOCUMENTS

| 1,315,735 A | * | 9/1919 | Michell | ................... F16C 17/04 |
|---|---|---|---|---|
| | | | | 384/223 |
| 2,363,260 A | * | 11/1944 | Peskin | ..................... D07B 7/06 |
| | | | | 384/311 |

(Continued)

FOREIGN PATENT DOCUMENTS

| GB | 1117391 A | * | 6/1968 | ............... G01F 1/10 |
|---|---|---|---|---|
| JP | 03038506 Y2 | | 8/1991 | |

(Continued)

*Primary Examiner* — Marcus Charles
(74) *Attorney, Agent, or Firm* — Volpe and Koenig, P.C.

(57) ABSTRACT

A gas bearing assembly includes a snap joint for attaching an externally pressurized porous gas bearing to a bearing cartridge. The gas bearing assembly has an adjustment screw which supplies a gas to an end of the adjustment screw via a through bore. The externally pressurized porous gas bearing has a housing portion with a washer and a snap ring. The gas bearing assembly additionally includes an air transfer tube positioned in the end of the adjustment screw and the housing portion. The washer and the snap ring retain the housing portion on the end of the adjustment screw to removably retain the bearing on the bearing cartridge.

16 Claims, 3 Drawing Sheets

(51) Int. Cl.
*F01D 25/18* (2006.01)
*F16C 33/66* (2006.01)
*F01D 25/22* (2006.01)

(56) References Cited

U.S. PATENT DOCUMENTS

| | | | | | |
|---|---|---|---|---|---|
| 2,710,234 | A | * | 6/1955 | Hansen | F16C 32/0666 184/5 |
| 3,004,804 | A | * | 10/1961 | Pinkus | F16C 17/03 384/311 |
| 3,063,762 | A | * | 11/1962 | Hirtz | F16C 17/03 384/312 |
| 3,549,215 | A | * | 12/1970 | Hollingsworth | F16C 17/03 384/117 |
| 3,918,770 | A | * | 11/1975 | Rouch | F16C 13/04 384/205 |
| 3,972,572 | A | * | 8/1976 | Hohn | F16C 17/03 384/312 |
| 3,988,046 | A | | 10/1976 | Okano | |
| 4,032,199 | A | * | 6/1977 | Jenness | B02C 17/181 384/310 |
| 4,381,128 | A | * | 4/1983 | Vohr | F16C 17/03 384/154 |
| 4,490,054 | A | * | 12/1984 | Kimmelaar | B23Q 1/38 384/117 |
| 4,643,592 | A | * | 2/1987 | Lewis | F16C 17/03 384/100 |
| 5,738,356 | A | * | 4/1998 | Marshall | F01D 25/186 277/313 |
| 5,743,654 | A | * | 4/1998 | Ide | F01D 25/164 384/100 |
| 5,743,657 | A | * | 4/1998 | O'Reilly | F16C 17/03 384/312 |
| 6,623,164 | B1 | * | 9/2003 | Gozdawa | F16C 17/03 384/117 |
| 6,629,778 | B1 | * | 10/2003 | Enderle | F16C 29/02 384/103 |
| 7,425,097 | B1 | * | 9/2008 | Chappell | G01C 19/16 384/109 |
| 7,762,133 | B2 | * | 7/2010 | Chappell | G01C 19/20 73/178 R |
| 8,052,327 | B2 | | 11/2011 | Fujikawa et al. | |
| 8,753,014 | B2 | | 6/2014 | Devitt | |
| 9,416,820 | B2 | * | 8/2016 | Ertas | F16C 32/0662 |
| 2014/0248008 | A1 | * | 9/2014 | Brahm | F16C 17/03 384/117 |
| 2015/0159692 | A1 | * | 6/2015 | Dourlens | F16C 17/03 384/192 |

FOREIGN PATENT DOCUMENTS

| | | |
|---|---|---|
| JP | 2008-298275 A | 12/2008 |
| KR | 10-2011-0105390 A | 9/2011 |
| WO | 2010082027 A1 | 7/2010 |

* cited by examiner

SNAP JOINT FOR EXTERNALLY PRESSURIZED GAS BEARINGS

FIELD OF INVENTION

The present invention relates to connection assemblies for parts of a gas bearing, and, more particularly, to a snap joint for externally-pressurized gas bearings.

BACKGROUND

Gas bearings are a particular type of bearing which uses pressurized gas, such as air, to maintain a gap between a rotating component and the bearing to reduce friction. A gas source typically supplies pressurized gas to a porous media which expels the gas to maintain the gap. In order for the pressurized gas to reach the gap, a fluid path must be present to deliver the gas to the porous media from the source. In some cases, various parts of the bearing may be removable and/or interchangeable. Therefore, there is a need for an easy and efficient connection mechanism which enables a desired fluid path from the source to the porous media while maintaining a strong mechanical connection.

SUMMARY

In one aspect, the present disclosure is directed to a gas bearing assembly. The gas bearing assembly includes an adjustment screw, an externally pressurized porous gas bearing, and an air transfer tube. The adjustment screw is configured to supply a gas to an end of the adjustment screw via a through bore. The externally pressurized porous gas bearing includes a housing portion with a washer and a snap ring. The air transfer tube is positioned in the end of the adjustment screw and the housing portion. The washer and the snap ring retain the housing portion on the end of the adjustment screw.

In another aspect, the present disclosure is directed to a device. The device includes a gas bearing assembly, a mounted component supporting the gas bearing assembly, and a shaft supported by the gas bearing assembly. The gas bearing assembly includes a bearing cartridge having an adjustment screw for supplying a gas and a radial bearing attached to the adjustment screw by a snap joint such that the radial bearing is configured to be connected and disconnected from the bearing cartridge by hand.

BRIEF DESCRIPTION OF THE DRAWING(S)

The foregoing summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure is directed to a snap joint for externally-pressurized gas bearings. The snap joint allows a given bearing pad to be easily assembled into, and disassembled out of, a bearing cartridge. The snap-on, snap-off functionality of the disclosed joint allows for use of a variety of bearing pads which each fit into the same bearing cartridge, thereby matching a variety of potential shaft journal diameters. This functionality eases assembly and disassembly, and also alleviates the need for having a distinct cartridge for each set of bearing pads. Moreover, the snap joint does not inhibit the fluid path, as it allows for the routing of externally-supplied gas through the mounting feature, and ultimately directly through the porous media bearing face.

Figure 1:
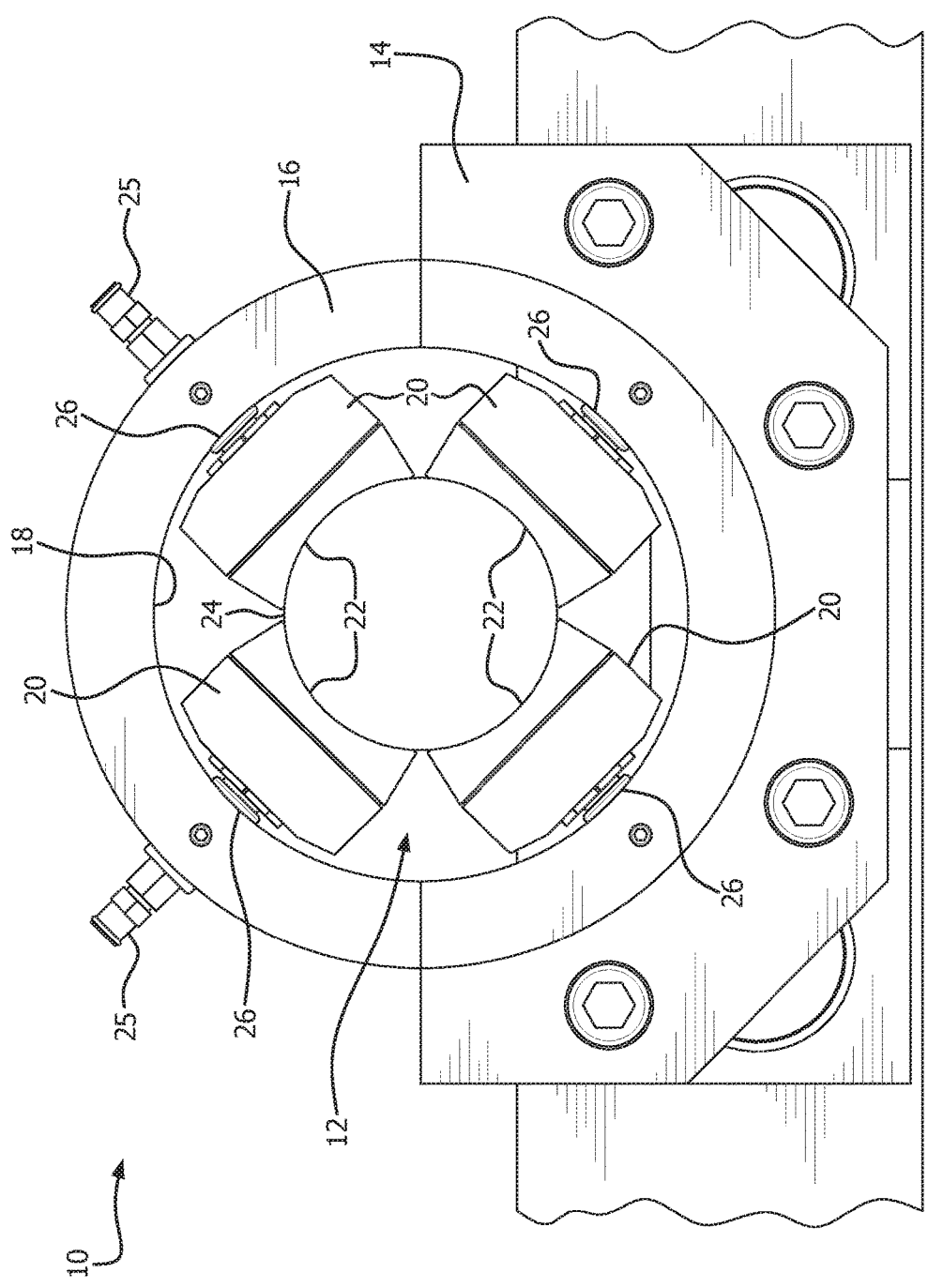
FIG. 1 is an illustration of an exemplary device which includes a gas bearing assembly.

FIG. 1 is an example of a device 10 which includes a gas bearing assembly 12. In one embodiment, the device 10 is a balancing machine and the gas bearing assembly 12 includes a radial gas bearing. It should be understood, however, that the disclosed embodiments are not limited to this example. The device 10 includes a mounted portion 14 which supports the gas bearing assembly 12.

The gas bearing assembly 12 includes a bearing cartridge 16. The bearing cartridge 16 includes an inner surface 18 which defines the axial opening of the bearing cartridge 16. The bearing cartridge 16 is preferably circular (but may have other shapes or configurations) having a constant inner diameter at the inner surface 18. The gas bearing assembly 12 further includes a plurality of radial bearings 20. The radial bearings 20 are preferably externally pressurized porous gas bearings. Each radial bearing 20 is attached to the bearing cartridge 16 to thereby form a bearing surface 22 for a rotating component, such as a shaft 24. A gas source (not shown) delivers pressurized gas (e.g., air) to an air fitting 25, which delivers the gas to the radial bearings 20. The radial bearings 20 expel the gas at the porous bearing surface 22 in order to maintain a gap between the radial bearings 20 and the shaft 24. The manner in which the radial bearings 20 act as a bearing to reduce friction is further described, for example, in U.S. Pat. No. 8,753,014, which is hereby incorporated by reference in its entirety.

Figure 2:
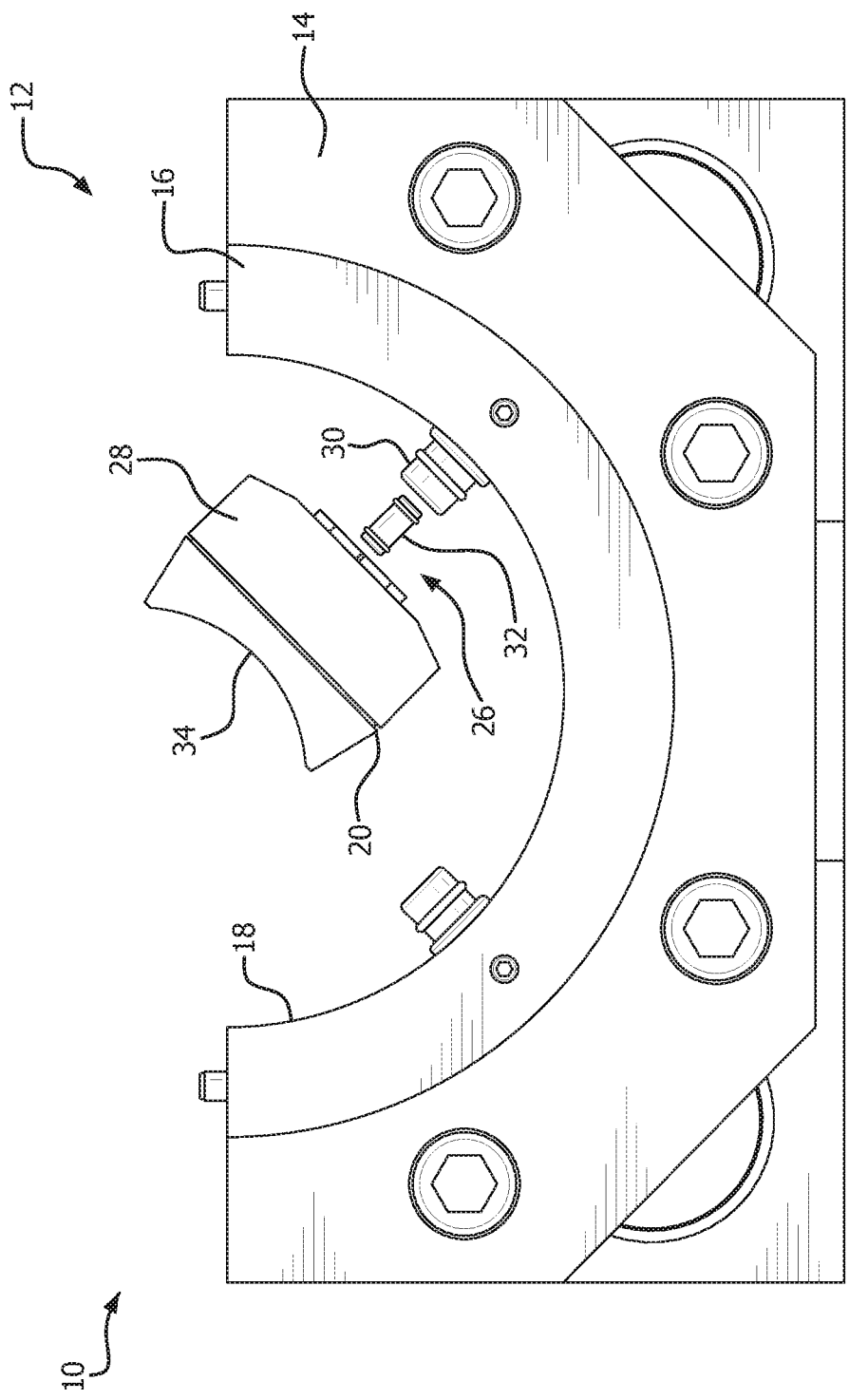
FIG. 2 is an illustration of a disassembled radial bearing having a snap joint connection.

FIG. 2 further illustrates the gas bearing assembly 12, including one of the radial bearings 20 disassembled from the bearing cartridge 16. In accordance with disclosed embodiments, the radial bearing 20 is configured to be attached to the bearing cartridge 16 by way of a snap joint 26. The snap joint 26 allows for quick and easy attachment and removal of the radial bearing 20. Each radial bearing 20 is attached by a respective snap joint 26. The snap joint 26 is preferably a spring-loaded snap joint which enables quick tooling changeover in the device 10 and gas bearing assembly 12. The snap joint 26 enables connection and disconnection of the radial bearing 20 to and from the bearing cartridge 16 by hand (e.g., without the need for tools), as the snap joint 26 provides a retention force and is actuatable by user simply moving the radial bearing 20 into place.

The snap joint 26 is at least partially formed in a housing portion 28 of the radial bearing 20. The snap joint 26 in the housing portion 28 is formed as a receiving portion which is aligned with an adjustment screw 30 on the bearing cartridge 16. The adjustment screw 30 may be threaded into the bearing cartridge 16, but it should be understood that the term adjustment screw is intended to encompass other types of fasteners, including non-threaded connections. The adjustment screw 30 may be configured as a flexure mount, rigid element, or other configuration.

An air transfer tube 32 may be positioned between the adjustment screw 30 and the receiving portion in the radial bearing 20 in order to help facilitate the transfer of gas from the adjustment screw 30 into the radial bearing 20. The air transfer tube 32 may be a separate component, as shown in FIG. 2, or may be integral with the radial bearing 20 or adjustment screw 30. The air transfer tube 32 provides a sealed air supply interface between the housing portion 28 and the adjustment screw 30. The air transfer tube 32 may be pre-assembled with either the radial bearing 20 or the bearing cartridge 16.

Figure 3:
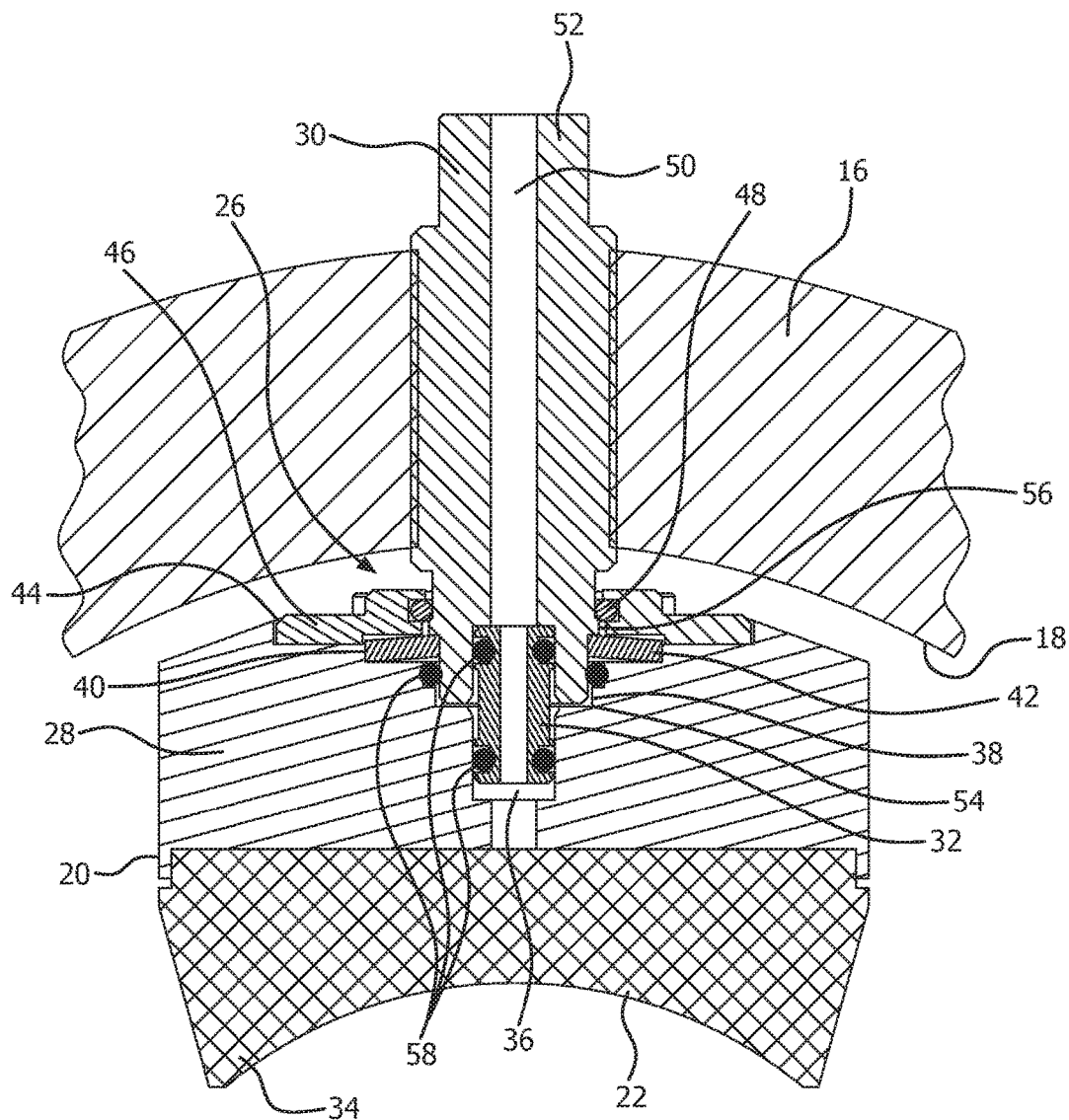
FIG. 3 is a cross-sectional view of a snap joint connection for a radial bearing.

FIG. 3 is a cross-sectional view of the snap joint 26 with the radial bearing 20 attached to the bearing cartridge 16. The radial bearing 20 includes the housing portion 28 and porous media wafer 34. The housing portion 28 includes cutout portions which are configured to receive elements of the snap joint 26. For example, the housing portion 28 includes a delivery channel 36 which is fluidly connected to the rear face of the porous media wafer 34. The delivery channel 36 is configured to receive a first end of the air transfer tube 32.

The housing portion 28 also includes a first cutout 38 formed at an the delivery channel 36 and including a diameter greater than the delivery channel 36 in order to produce a stop surface for an end of the adjustment screw 30. A second cutout 40 is formed outward of the first shoulder 38 and is configured to receive a washer 42. The washer 42 is preferably a Belleville washer which provides some spacing compliance, but could also be a rigid flat washer. A third cutout 44 may be formed outward of the second cutout 40 and is configured to receive a spring clip retainer 46. The spring clip retainer 46 is securely attached to the housing portion 28, such as by bolts, or may be integrally formed therewith. The spring clip retainer 46 includes a snap ring 48 at an inner diameter thereof. The snap ring 48 may be a C-shaped elastic ring configured to apply a force in a radial direction of the snap ring 48.

The adjustment screw 30 protrudes from the bearing cartridge 16. The adjustment screw 30 may be threaded into a corresponding opening in the bearing cartridge 16, or may be attached by some other means. For example, the adjustment screw 30 may be integral with the bearing cartridge 16. The adjustment screw 30 includes a through bore 50 configured to deliver gas from a first end 52 connected to a gas source (directly or indirectly) to a second end 54 which is connected to the radial bearing 20. The second end 54 of the adjustment screw 30 may include a plenum for receiving the air transfer tube 32, as shown in FIG. 3.

The adjustment screw 30 further includes features on an outer diameter thereof in the vicinity of the second end 54 which facilitate the connection to the radial bearing 20 via the snap joint 26. For example, the adjustment screw 30 preferably includes a ridge 56. The second end 54 of the adjustment screw is preferably sized such that the outermost portion fits in the first cutout 38 of the snap joint 26 but the ridge 56 contacts the washer 42. In addition, the ridge 56 is sized to move past the snap ring 48, which engages the adjustment screw 30 on an opposing side of the ridge 56.

The disclosed features enable the radial bearing 20 to be connected to the bearing cartridge 16 by way of the snap joint 26 at the interface of the housing portion 28 and the adjustment screw 30, with the air transfer tube 32 therebetween. In order to install the radial bearing 20 onto the adjustment screw 30, the housing portion 28 is pressed firmly onto the second end 54 of the adjustment screw 30. The user may use a rocking or circular motion to help slide the radial bearing 20 and move the various components into place. The radial bearing 20 is thereby held in place by at least the snap ring 48. The washer 42 and the snap ring 48 are positioned on opposite sides of the ridge 56 and help to center and retain the radial bearing 20. The user can lightly pull on the radial bearing 20 to ensure that the bearing is properly seated.

The snap joint 26 incorporates a plurality of O-rings 58 in order to help seal the fluid path from the adjustment screw 30 to the porous media wafer 34. For example, O-rings may be positioned at each end of the air transfer tube 32 to ensure a sealing connection to each of the housing portion 28 and adjustment screw 30. An additional O-ring may be positioned beneath the washer 42 in order to seal and possibly help retain the endmost portion of the adjustment screw 38 in the first cutout 38. After assembly of the gas bearing assembly 12, the gas can be turned on so that the snap joints 26 can be inspected for leaks to further ensure proper connections. After proper connections are established, the radial bearings 20 can be supplied with a gas to produce a bearing surface at the porous media wafers 34 in a known manner.

The components of the gas bearing assembly 12, such as the bearing cartridge 16, housing portion 28, adjustment screw 30, air transfer tube 32, washer 42, spring clip retainer 46, and snap ring 48 are preferably formed of steel, but other materials may be used depending on the application. Moreover, it should be understood that other devices may implement a bearing assembly which takes advantage of the disclosed snap joint 26. The radial bearings 20 may be the curved bearings shown or may be other types of bearings, such as a flat bearing.

The disclosed gas bearing assembly including a snap joint is particularly applicable to radial bearings, but is not limited thereto. In the exemplary disclosed embodiment of a radial bearing assembly having a plurality of radial bearings connected to a bearing cartridge by way of individual snap joints, several advantages are achieved. For example, a variety of radial bearing components may be made to be interchangeable with the same adjustment screws, and thus the same bearing cartridge. In this way, different bearings could be changed out to use the same bearing cartridge to support shafts having different diameters. Moreover, various configurations of the bearings are possible. For example, while four radial bearings are illustrated in FIG. 1, other configurations may include different numbers of bearings and connections, depending on the application and bearing needed.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A gas bearing assembly, comprising:
   a threaded adjustment screw configured to supply a gas to a first end of the adjustment screw via a through bore, wherein the threaded adjustment screw has the first end and a second end, and the second end has a radially extended external ridge;
   an externally pressurized porous gas bearing including a housing portion with a washer and a snap ring; and an air transfer tube positioned internal to the second end of the threaded adjustment screw and the housing portion,
wherein the washer and the snap ring engagingly abut the ridge of the second end of the threaded adjustment screw.

2. The assembly of claim 1, wherein a fluid path for the gas extends from the threaded adjustment screw to a rear face of a porous media wafer of the externally pressurized porous gas bearing.

3. The assembly of claim 2, wherein the air transfer tube forms part of the fluid path.

4. The assembly of claim 3, wherein the air transfer tube is sealed by O-rings to the threaded adjustment screw and the housing portion.

5. The assembly of claim 1, wherein the threaded adjustment screw is attached to a bearing cartridge.

6. The assembly of claim 5, wherein the threaded adjustment screw is threaded into the bearing cartridge.

7. The assembly of claim 1, wherein the externally pressurized porous gas bearing is a radial bearing.

8. The assembly of claim 1, wherein the threaded adjustment screw is connectable to a variety of bearings having different shapes.

9. The assembly of claim 1, wherein the washer is a Belleville washer.

10. The assembly of claim 1, wherein the externally pressurized porous gas bearing further comprises a spring clip retainer which positions the snap ring.

11. A device, comprising,
a gas bearing assembly;
a mounted component supporting the gas bearing assembly; and
a shaft supported by the gas bearing assembly,
wherein the gas bearing assembly comprises:
a bearing cartridge having a threaded adjustment screw for supplying a gas, wherein the threaded adjustment screw has a first end and a second end; and
a radial bearing attached to the second end of the threaded adjustment screw by a snap joint such that the radial bearing is configured to be connected and disconnected from the bearing cartridge by hand, wherein the snap joint comprises a snap ring and a washer that engagingly abut a radially extended ridge of the second end of the threaded adjustment screw.

12. The device of claim 11, wherein the snap joint further comprises a Belleville washer.

13. The device of claim 11, wherein the gas bearing assembly includes a plurality of radial bearings.

14. The device of claim 13, wherein each radial bearing is an externally pressurized porous gas bearing.

15. The device of claim 14, wherein each radial bearing includes a housing portion which receives the threaded adjustment screw.

16. The device of claim 15, wherein each housing portion includes a plurality of cutouts at varying diameters.

* * * * *